US012266862B2

(12) United States Patent
Adams et al.

(10) Patent No.: US 12,266,862 B2
(45) Date of Patent: Apr. 1, 2025

(54) ULTRA-LOW-COST 1D-SCANNING ANTENNA ARRAY

(71) Applicant: The Boeing Company, Chicago, IL (US)

(72) Inventors: Alec Adams, Seattle, WA (US); Lixin Cai, Ravensdale, WA (US); Robert John Greenlaw, Huntington Beach, CA (US)

(73) Assignee: The Boeing Company, Arlington, VA (US)

( * ) Notice: Subject to any disclaimer, the term of this patent is extended or adjusted under 35 U.S.C. 154(b) by 21 days.

(21) Appl. No.: 17/588,178

(22) Filed: Jan. 28, 2022

(65) Prior Publication Data

US 2023/0104894 A1 Apr. 6, 2023

Related U.S. Application Data

(60) Provisional application No. 63/251,573, filed on Oct. 1, 2021.

(51) Int. Cl.
*H01Q 21/06* (2006.01)
*H01Q 9/04* (2006.01)
*H01Q 15/14* (2006.01)

(52) U.S. Cl.
CPC ......... *H01Q 21/065* (2013.01); *H01Q 9/0414* (2013.01); *H01Q 9/0464* (2013.01); *H01Q 15/144* (2013.01)

(58) Field of Classification Search
CPC ............... H01Q 21/065; H01Q 9/0414; H01Q 9/0464; H01Q 15/144
See application file for complete search history.

(56) References Cited

U.S. PATENT DOCUMENTS 5,055,852 A 10/1991 Dusseux et al.
7,486,239 B1 * 2/2009 Channabasappa ... H01Q 9/0414 343/700 MS (Continued)

FOREIGN PATENT DOCUMENTS

DE 602004007773 T2 * 12/2007 ........... H01Q 9/0407
KR 20040080161 A * 9/2004

OTHER PUBLICATIONS

Rogers 4003 and Rogers 3003 PCB Manufacturer, captured by Wayback Machine in 2018 from Rayming PCB & Assembly website, https://web.archive.org/web/20180508104136/https://www.raypcb.com/rogers-material-pcb-rogers-4003-and-rogers-3003/ (Year: 2018).*

(Continued)

*Primary Examiner* — Dameon E Levi
*Assistant Examiner* — Anh N Ho
(74) *Attorney, Agent, or Firm* — Harrity & Harrity, LLP

(57) ABSTRACT

Antenna elements are disclosed herein that include a metallic square ring patch and a metallic square ring slot to transmit or receive radio frequency (RF) signals. The disclosed antenna elements use several dielectric layers that are separated by two low-dielectric foam layers. The square ring patch is located above an upper foam layer, and a square ring slot is located between the upper foam layer and a bottom foam layer. Electrical feed lines are used to either supply electrical power to the antenna elements cells or output RF signals that are received by the square ring patch. The disclosed antenna elements may be arranged together in an antenna array that is tunable to collectively generate or receive RF signals.

20 Claims, 6 Drawing Sheets

(56) References Cited

U.S. PATENT DOCUMENTS

| | | | | |
|---|---|---|---|---|
| 8,350,771 | B1 * | 1/2013 | Zaghloul | H01Q 5/40 343/769 |
| 8,773,323 | B1 * | 7/2014 | Manry, Jr. | H01Q 21/28 343/841 |
| 2004/0217907 | A1 * | 11/2004 | Inoue | H01Q 9/0464 343/700 MS |
| 2005/0190106 | A1 * | 9/2005 | Anguera Pros | H01Q 9/0414 343/846 |
| 2015/0084814 | A1 | 3/2015 | Rojanski et al. | |
| 2020/0021026 | A1 * | 1/2020 | Mitchell | H01Q 21/28 |
| 2020/0076083 | A1 * | 3/2020 | Fukunaga | H01Q 9/0457 |
| 2020/0335869 | A1 * | 10/2020 | Jia | H01Q 9/0457 |
| 2020/0381842 | A1 * | 12/2020 | Milroy | H01Q 21/00 |
| 2022/0077583 | A1 * | 3/2022 | Jian | H01Q 1/243 |
| 2022/0368028 | A1 * | 11/2022 | Govoni | H01Q 25/02 |

OTHER PUBLICATIONS

"Rogers RO4400 Series(RO4450F, RO4460G2) material specification", iPCB website, https://www.ipcb.com/material/431.html (Year: 2023).*

"RO4000data", https://www.mirrorsemi.com/pdf/Rogers_RO4003C_Data_Sheet.pdf, captured in 2020 from Wayback Machine (Year: 2020).*

"Rogers PCB Vs Fr4 PCB and its Performance", https://hillmancurtis.com/rogers-pcb/, Captured in 2020 from Wayback Machine (Year: 2020).*

The-Nan Chang et al, "A Circularly Polarized Ring-Antenna Fed by a Serially Coupled Square Slot-Ring," IEEE Transactions on Antennas and Propagation, IEEE, USA, vol. 60, No. 2, dated Oct. 21, 2011.

Extended European Search Report, Application No. 22196914.0, dated Feb. 20, 2023.

* cited by examiner

ULTRA-LOW-COST 1D-SCANNING ANTENNA ARRAY

CROSS-REFERENCE TO RELATED APPLICATIONS

This application claims priority to U.S. Provisional Application Ser. No. 63/251,573 entitled "ULTRA-LOW-COST 1D-SCANNING ANTENNA ARRAY" that was filed on Oct. 1, 2021, which is incorporated herein by reference in its entirety.

BACKGROUND

A phased array antenna ("PAA") is a type of antenna that includes a plurality of sub-antennas (generally known as antenna elements, array elements, or radiating elements of the combined antenna) in which the relative amplitudes and phases of the respective signals feeding the array elements may be varied in a way that the effect on the total radiation pattern of the PAA is reinforced in desired directions and suppressed in undesired directions. In other words, a beam may be generated that may be pointed in or steered into different directions. Beam pointing in a transmit or receive PAA is achieved by controlling the amplitude and phase of the transmitted or received signal from each antenna element in the PAA.

The individual radiated signals are combined to form the constructive and destructive interference patterns produced by the PAA that result in one or more antenna beams. The PAA may then be used to point the beam, or beams, rapidly in azimuth and elevation.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

The disclosed examples and implementations are directed to antenna elements that may be positioned together to form an antenna array (or PAA), which may be affixed or incorporated in curved or conformal structures (e.g., aircraft bodies). The disclosed antenna elements use a number of stacked dielectric layers, at least two of which are separated by a low-dielectric foam layer, such as a core or low-dielectric foam or honeycomb material with low average dielectric constant structure. A horizontal top dielectric layer supports a microstrip square ring patch radiator and also serves as an environmental shield against corrosion. A square ring patch cutout hole reduces the resonance frequency of the patch and allows a smaller outside diameter which is desirable for mutual coupling reduction and avoidance of over-emphasis of broadside antenna gain. A lower section includes two layers of dielectric substrates to support a square ring slot and feed lines (e.g., single line providing single linear polarization or dual feed lines providing dual linear polarization) for providing RF power or carrying away received RF signals. The feed lines excite orthogonal resonant modes in the square ring slot, which, in turn excite orthogonal resonant modes in the square ring patch above. The square ring slot and square ring patch work together to provide a wider impedance bandwidth than either one alone could provide. The antenna elements may operate in transmit or receive RF modes.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Corresponding reference characters indicate corresponding parts throughout the accompanying drawings.

DETAILED DESCRIPTION

Figure 1:
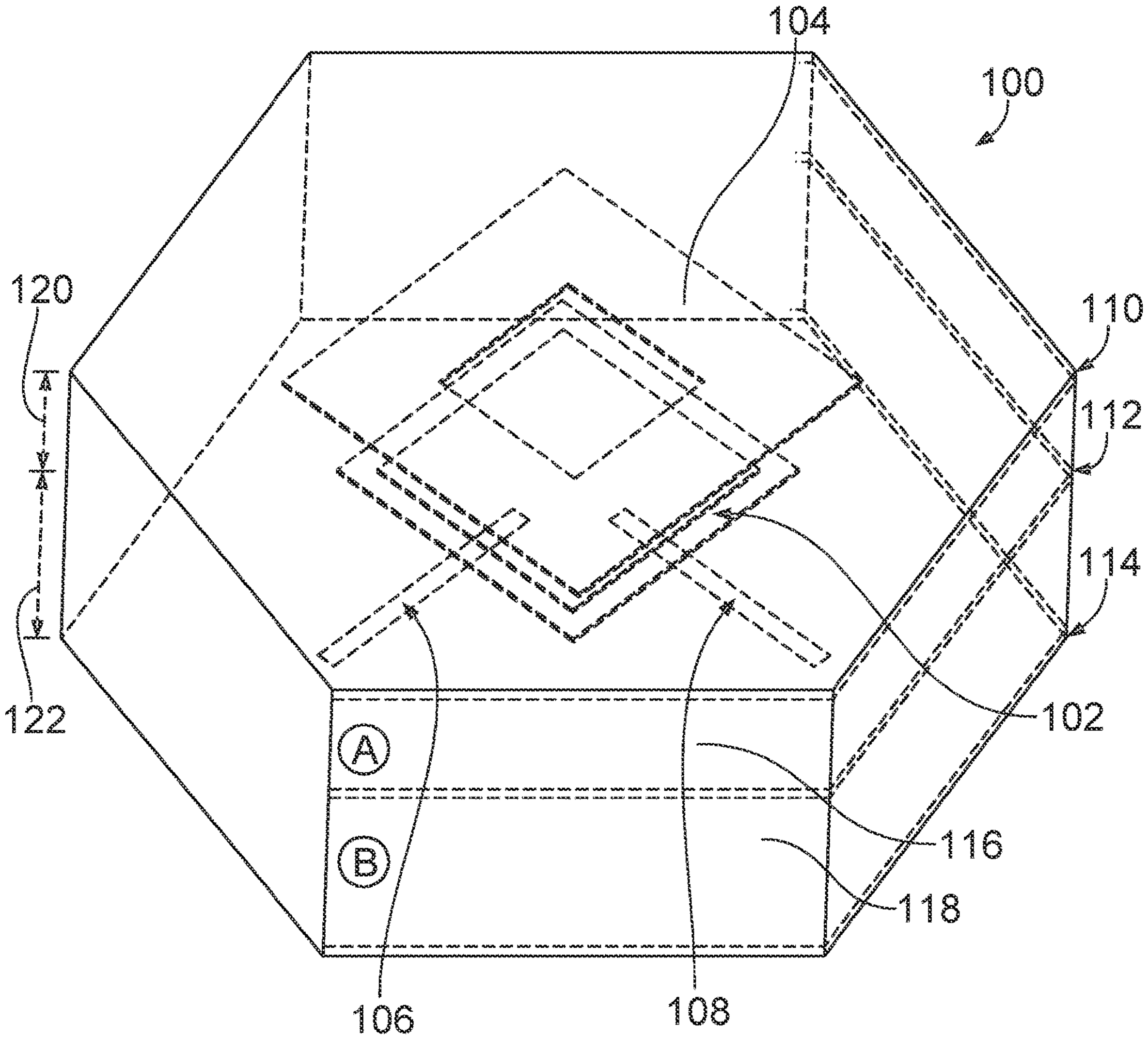
FIG. 1 illustrates a perspective view of an antenna element with a square radiator, according to some of the disclosed implementations.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

A phased array antenna (PAA) includes multiple emitters and is used for beamforming in high-frequency RF applications, such as in radar, 5G, or myriad other application. The number of emitters in a PAA can range from a few into the thousands. The goal in using a PAA is to control the direction of an emitted beam by exploiting constructive interference between two or more radiated signals. This is known as "beamforming" in the antenna community.

More specifically, a PAA enables beamforming by adjusting the phase difference between the driving signal sent to each emitter in the array. This allows the radiation pattern to be controlled and directed to a target without requiring any physical movement of the antenna. This means that beamforming along a specific direction is an interference effect between quasi-omnidirectional emitters (e.g., dipole antennas).

The disclosed implementations and examples provide an ultra-low-cost unit cell antenna element with unique feed structure for an electronically scanning array. The antenna element includes circuit board-like sections and low-dielectric spacers, such as a foam or core structure. A top section of the antenna element includes a layer of dielectric substrate to support a microstrip ring patch radiator. A bottom section has one layer of dielectric substrates to support a ring slot and dual feed lines. The disclosed antenna elements provide high-quality antenna performance over wide frequency bandwidth and up to +/−45 deg 1D scan range (from antenna normal) as well as dual-linear polarizations and circular polarization.

The disclosed antenna elements are able to send or receive RF signals to and from vehicles and aircraft with an agile electronically-scanning antenna array beam without mechanical moving parts. The antenna elements may be assembled into an antenna array that may be used in a host of applications, such as, for example but without limitation, for radar, sensor, or other applications. The antenna elements provide a high-performance, light-weight, low-profile, and ultra-low-cost solution to meet challenging and evolving mission requirements. Moreover, the disclosed antenna elements are used in the fabrication of integrated and structurally-integrated antennas, specifically in composite sandwich panels due to the minimal use of through-depth vias and connections.

Conventional antennas use relatively bulky waveguide-based antenna radiators to form the aperture section of an electronically scanning antenna array system. Such systems are mechanically complex and expensive to manufacture and are not expected to meet customer demands in the future. Modem solutions require complex multiple-layer boards with many through-thickness connections. These multi-layer designs do not lend themselves to low-cost manufacturing or to integrated composite manufacturing.

FIG. 1 shows an embodiment of the invention using circuit board-like sections to form a unit cell in a periodic antenna array environment. The top section has one layer of dielectric substrate or low-cost circuit board to support a microstrip square-ring patch radiator on the underside and also serves as an environmental shield against corrosion. The square-ring patch cutout hole reduces the resonance frequency of the patch and allows a smaller outside diameter which is desirable for mutual coupling reduction and avoidance of over-emphasis of broadside antenna gain. While a square shape is illustrated here other geometries such as circular may be used.

The bottom section has one layer of dielectric substrate or circuit board to support a square-ring slot on the top side and dual feed lines on the bottom side. The feed lines excite orthogonal resonant modes in the square-ring slot which in turn excite orthogonal resonant modes in the square-ring patch above. The square-ring slot and patch work together to provide a wider impedance bandwidth than either one alone could provide. This hybrid radiator is designed to work in both transmit and receive modes. A metallic ground plane is provided by a dielectric substrate or circuit board at the bottom of the structure to redirect backward radiation to the forward direction. This back board also provides mechanical symmetry and support.

FIG. 1 illustrates a perspective view of an antenna element 100 with a square radiator, according to some of the disclosed implementations. The square radiator is made up of a square ring slot 102 and a square ring patch 104 that operate to transmit or receive RF signals. The square ring slot 102 and the square ring patch 104 collectively create a "square radiator" for transmitting and/or receiving RF signals. In some implementations, the square ring patch 104 has a larger perimeter than the square ring slot 102.

The antenna element 100 also includes circuit board-like sections to form a unit cell in a periodic antenna array environment. Three dielectric layers are stacked on top of each other and separated: a top dielectric layer 110, middle dielectric layer 112, and bottom dielectric layer 114. Two foam layers, upper foam layer 116 and lower foam layer 118, separate the dielectric layers 110-114 from each other. These foam layers 116-118 may be any kind of a dielectric material with low average dielectric constant, such as, for example but without limitation, a foam layer. As shown, the dielectric layers 110-114 and foam layers 116-118 are the same hexagonal shape, providing mechanical symmetry and support. Other shapes are fully contemplated, e.g., circular, rectangular, square, octagonal, etc.

To aid the reader, an upper section 120 is depicted as well as a lower section 122. Also, the various components are discussed in relation to directions that assume the "top" and "upper" portions are located at "A" and the "bottom" and "lower" portions are located at "B."

The upper section 120 includes the square ring patch 104, the top dielectric layer 110, the upper foam layer 116. The lower section 122 includes the square ring slot 102, the middle dielectric layer 112, and the lower foam layer 118. The middle dielectric layer 112 supports the square ring slot 102 on the top side and the feed lines 106 and 108 on the bottom side.

While dual feed lines 106 and 108 are discussed, other implementations use a single feed line instead of dual. A single feed line provides single linear polarization. Dual feed lines provide dual linear polarization. For the sake of clarity, different implementations and examples are discussed as having dual feed lines 106 and 108.

The lower section 122 includes two layers of dielectric substrates, the middle dielectric layer 112 and the bottom dielectric layer 114, that collectively support the square ring slot 102, dual feed lines 106 and 108, and the square ring patch 104. The feed lines 106 and 108 provide electrical supply that excite orthogonal resonant modes in the square ring slot 102, which, in turn excites orthogonal resonant modes in the square ring patch 104 above for RF signaling. When transmitting RF signals, the electrical feed lines supply the RF power to generate electrical resonance in the square ring slot 102 that, then, generates the desired RF signal in the square ring patch 104. When receiving RF signals, the electrical feed lines receive RF power induced in the square ring slot 102 from the square ring patch 104 receiving an RF signal.

The square ring patch 104 is metallic or otherwise electrically conductive. Electricity is supplied to the antenna element 100 through the feed lines 106 and 108, causing the square ring slot 102 and the square ring patch 104 to operate as a radiating element for generating specific RF signals. As can be seen, the square ring patch 104 is positioned vertically above the square ring slot 102, at least in some implementations.

In operation, the dual electrical feed lines 106 and 108 excite orthogonal dual-linear polarizations necessary for some applications. For other applications, a dual or single circular polarization may be required.

Figure 2:
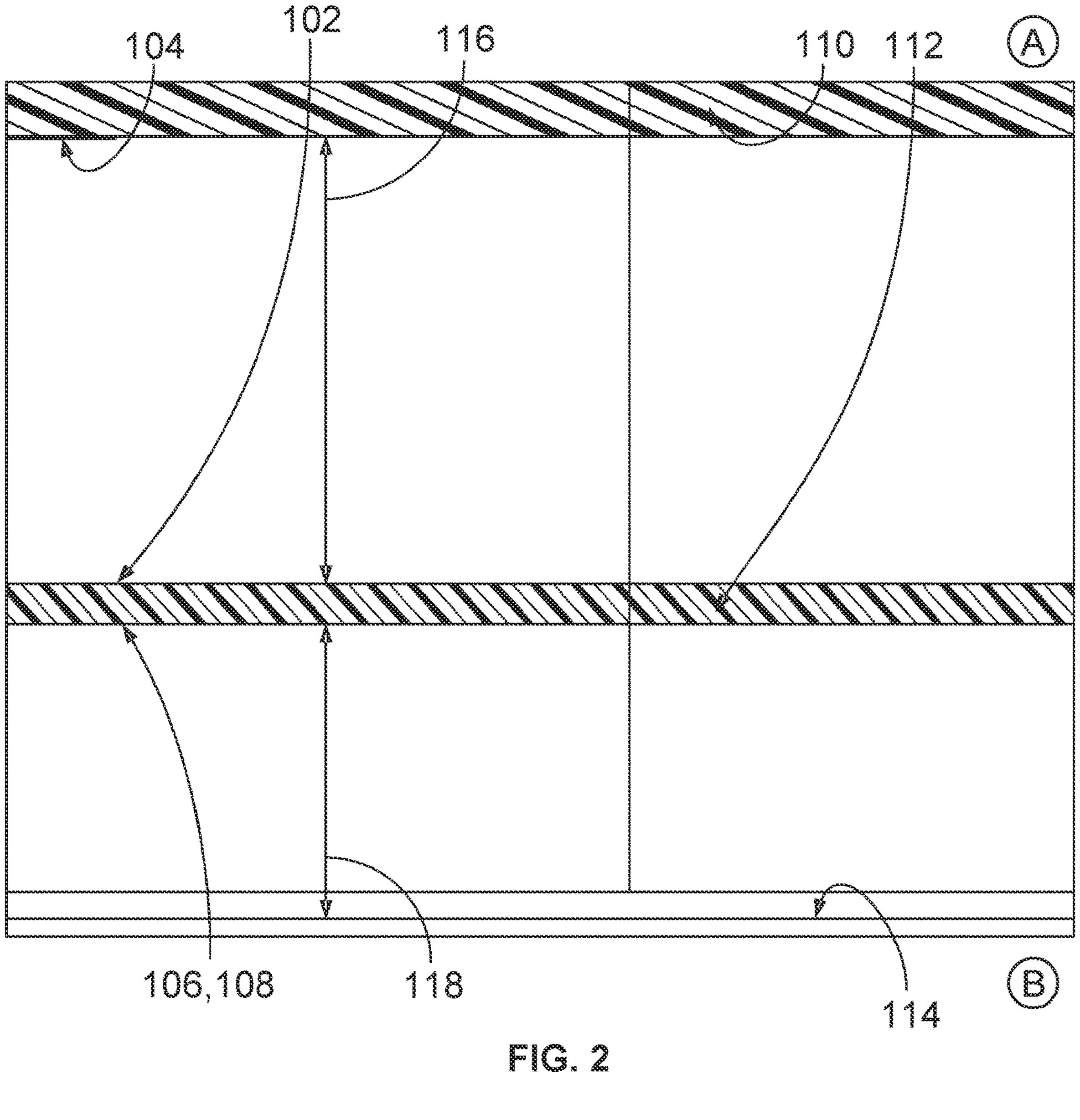
FIG. 2 illustrates a cut-out side view of an antenna element with a square radiator, according to some of the disclosed implementations.

FIG. 2 illustrates a cut-out side view of the antenna element 100 discussed above in FIG. 1, according to some of the disclosed implementations. The top dielectric layer 110 and the middle dielectric layer 112 are separated by the upper foam layer 116. The middle dielectric layer 112 and the bottom dielectric layer 114 are separated by the lower foam layer 118, which extends down to the bottom dielectric layer 114. The square ring patch 104 is positioned above the upper foam layer 116 and below the top dielectric layer 110. Reference direction A and B are illustrated to show the corresponding top and bottom of the antenna element 100, respectively.

The square ring slot 102 is a thin metal (or other conductive material) layer that is positioned above the middle dielectric layer 112 facing toward the top of the antenna element 100, below the upper foam layer 116. The feed lines 106 and 108 are also metal (or other conductive material) positioned on the bottom side of the middle dielectric layer 112 facing toward bottom of the antenna element 100, above the lower foam layer 118.

The upper foam layer 116 operates as a spacer between the square ring slot 102 and the square ring patch 104, providing a low average dielectric constant close to air to maximize scan impedance bandwidth and suppress unwanted dielectric modes. The lower foam layer 118 operates as a spacer between the square ring slot 102 and the bottom dielectric layer 114, which operates as a back plane. Similar to the upper foam layer 116, the lower foam layer 118 provides a low dielectric constant close to air to maximize scan impedance bandwidth and suppress unwanted dielectric modes.

Figure 3:
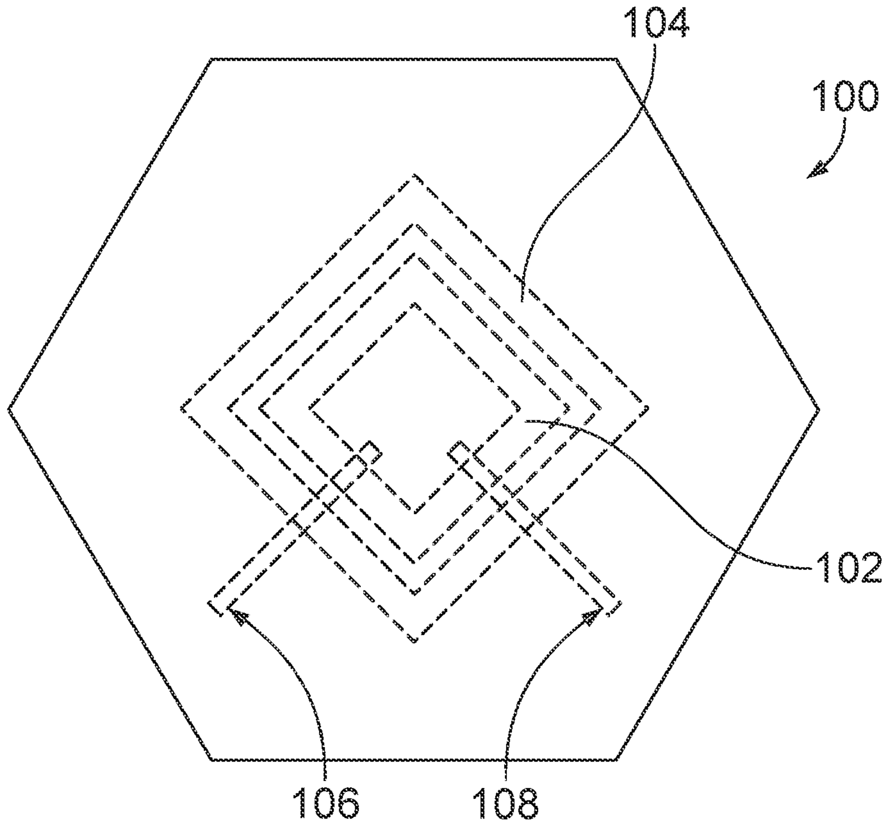
FIG. 3 illustrates a top view of the antenna element showing an example orientation of antenna feed lines, according to some of the disclosed implementations.

FIG. 3 illustrates a top view of the antenna element 100 showing an example orientation of the feed lines 106 and 108, according to some of the disclosed implementations. The example in FIG. 3 shows a top view of the antenna element 100 with the hybrid radiator comprising the square ring slot 102, the square ring patch 104, and the feed lines 106 and 108. For circular rotation, a 90-degree sequential rotation may be used to improve array far-field cross-polar performance; though, for single or dual-linear polarization, 90-degree sequential rotation is not used.

Figure 4:
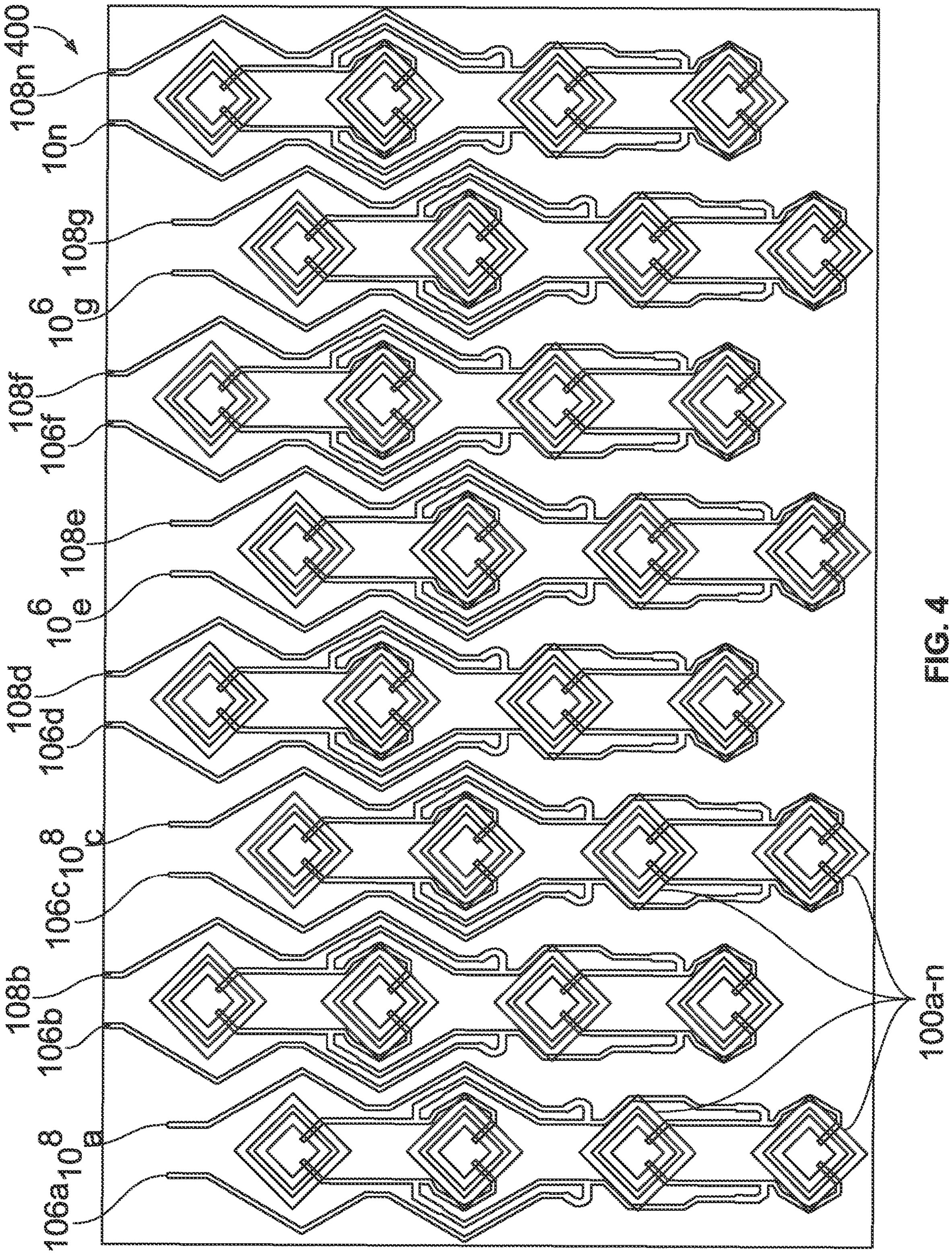
FIG. 4 illustrates a top view of an antenna array with a triangular-array lattice of multiple antenna elements, according to some of the disclosed implementations.

FIG. 4 illustrates a top view of an antenna array 400 with a triangular-array lattice of multiple antenna elements 100a-n, according to some of the disclosed implementations. The hexagonal boundaries of antenna elements 100*a-n* are not visible as there are no dividing walls between the antenna elements 100*a-n* in the depicted example. A triangular lattice is used to form the antenna array 400 to reduce cost compared to a rectangular or square lattice. Eliminating these dividing walls reduces manufacturing cost substantially. For each column of the antenna array 400, all antenna elements 100*a-n* are parallel-fed in phase by a power distribution network on a single layer. For a larger antenna array, additional layers are used to house a growing parallel-feed distribution network. Alternatively, a series feed may also be used without additional layers but at the expense of reduced bandwidth. Further still, a hybrid parallel- and series-feed scheme may be used to reach a compromise between lower cost and larger bandwidth.

In the shown implementation, the feed lines 106 and 108 provide two orthogonal polarizations that are each fed independently. By applying a time-delay or phase gradient across the different columns of the array, one-dimensional (1D) antenna beam scanning (left-to-right or right-to-left) may be achieved. For some radar or sensor applications, a 1D antenna beam scanning is sufficient if ultra-low cost is a priority and two-dimensional (2D) scanning is not required. A 2D scan may require every element (rather than successive columns of elements for 1D) to be fed by a different phase or time delay, resulting in a much higher manufacturing cost.

Figure 5:
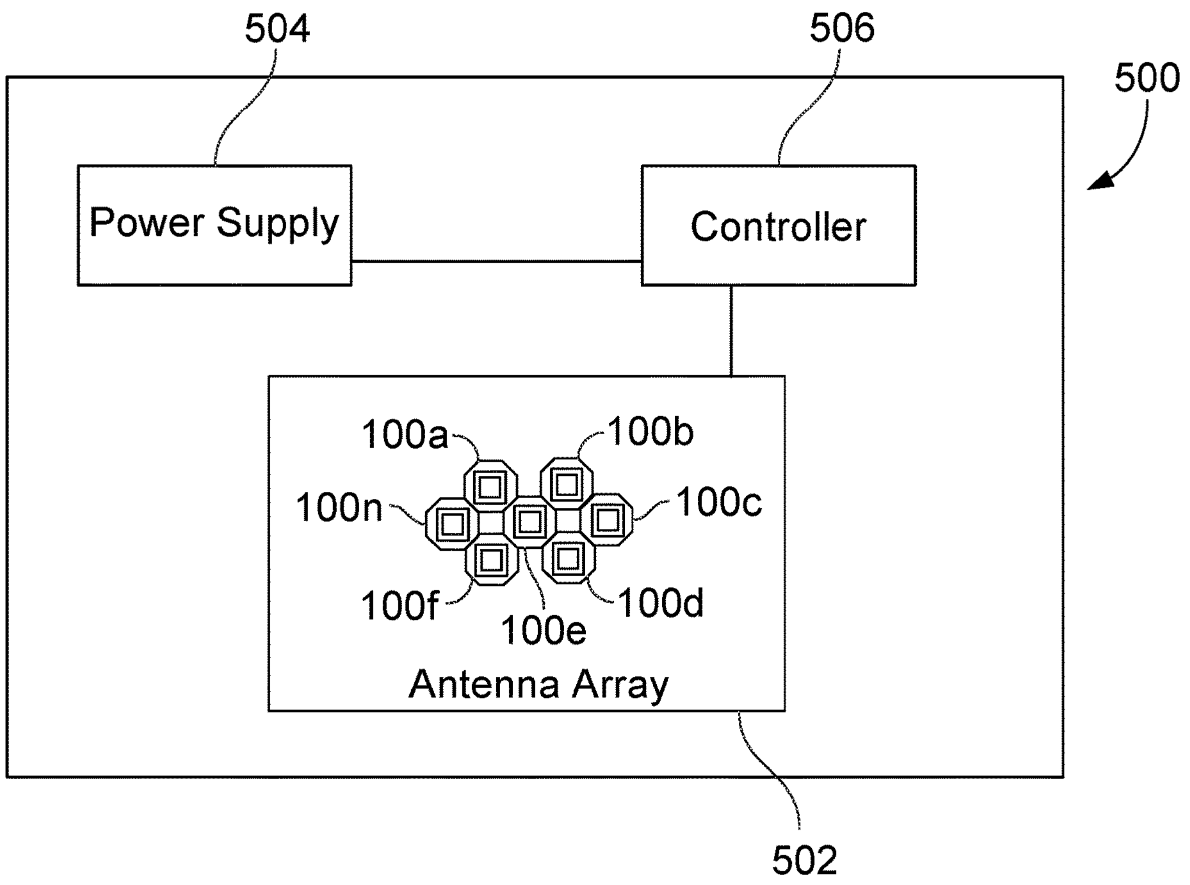
FIG. 5 illustrates a block diagram of an antenna system with an antenna array made up of the disclosed antenna elements in this disclosure.

FIG. 5 illustrates a block diagram of an antenna system 500 with an antenna array 502 made up of the disclosed antenna elements 100*a-n* in this disclosure. In this example, the antenna system 500 includes a power supply 504, a controller 506, and the antenna array 502. In this example, the antenna array 502 is a phased array antenna ("PAA") that includes a plurality of the antenna elements 102*a-n* that operate either transmit and/or receive modules. More specifically, the antenna array 500 may the previously discussed antenna array 300 that uses hexagonal-shaped antenna elements 100, the antenna array 500 that uses a triangular lattice, a combination thereof, or an alternatively shaped antenna array that uses the disclosed square ring slot 102 and square ring patch 104 as an RF transmitter/receiver. Thus, the antenna elements 100*a-n* of the antenna array 500 include corresponding radiation elements that in combination are capable of transmitting and/or receiving RF signals. For example, the antenna elements 100*a-n* may be configured to operate within a K-band frequency range (e.g., about 20 GHz to 40 GHz for NATO K-band and 18 GHz to 26.5 GHz for IEEE K-band).

The power supply 504 is a device, component, and/or module that provides power to the controller 506 in the antenna system 500. The controller 506 is a device, component, and/or module that controls the operation of the antenna array 502. The controller 506 may be a processor, microprocessor, microcontroller, digital signal processor ("DSP"), or other type of device that may either be programmed in hardware and/or software. The controller 506 controls the electrical feed supplies provided to the antenna array 502, including, without limitation calibrating particular polarization, voltage, frequency, and the like of the electrical feeds. Only one line is shown between the controller 506 and the antenna array 502 for the sake of clarity, but in reality, several electrical connections and supply lines may connect the controller 506 to the antenna array 502.

In some implementations, the controller 506 supplies the particular electrical feeds to the various antenna elements 100*a-n* in order to create numerous RF signals that combine, either constructively or destructively, to form a desired cumulative RF signal for transmission. RF signals emitted from each antenna element 100*a-n* in the array antenna 502 may be in phase so as to constructively produce intense radiation or out of phase to destructively create a particular RF signal. Direction may be controlled by setting the phase shift between the signals sent to different antenna elements 100*a-n*. The phase shift may be controlled by the controller 506 placing an appropriate phase delay or a slight time delay between signals sent to successive antenna elements 100*a-n* in the array.

One antenna system 500 may be in signal communication with another antenna system 500, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

This antenna system 500 provides a means to send (or receive) RF signals to (or from) airborne or mobile vehicles with an agile electronically scanning antenna array beam without mechanical moving parts. The antenna system 500 may be used in communications systems and other applications, including, without limitation, for radar/sensor, electronic warfare, military applications, mobile communications, and the like. The antenna system 500 provides a high-performance, light-weight, low-profile and affordable solution to meet challenging and evolving mission requirements.

Figure 6:
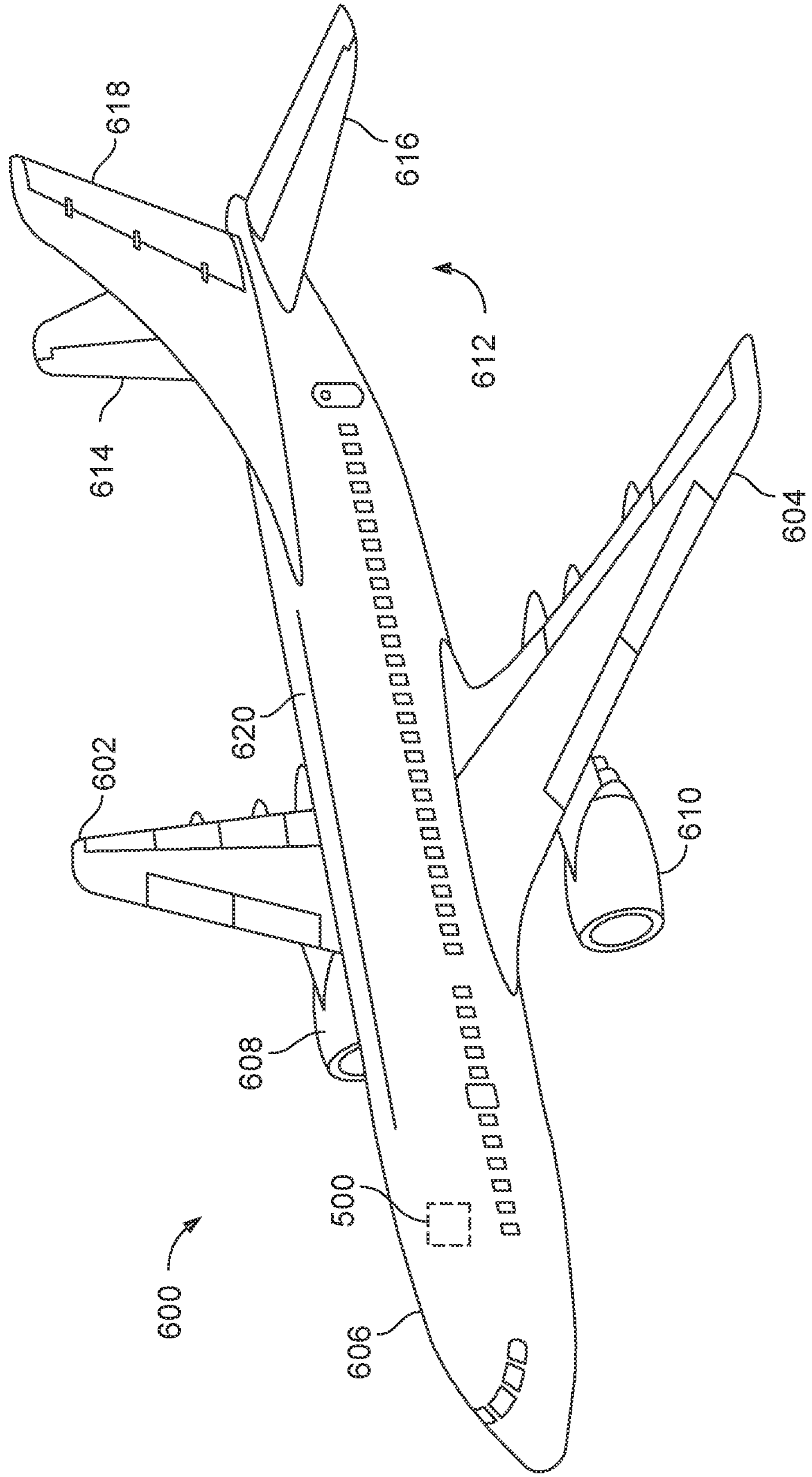
FIG. 6 illustrates a perspective view of an aircraft having one or more array antennas made up of the disclosed antenna elements in this disclosure.

FIG. 6 illustrates a perspective view of an aircraft having an antenna array 502 according to various implementations of the present disclosure. The aircraft 600 includes a wing 602 and a wing 604 attached to a body 606. The aircraft 600 also includes an engine 608 attached to the wing 602 and an engine 610 attached to the wing 604. The body 606 has a tail section 612 with a horizontal stabilizer 614, a horizontal stabilizer 616, and a vertical stabilizer 618 attached to the tail section 612 of the body 606. The body 606 in some examples has a composite skin 620.

In some examples, the previously discussed antenna system 500, which includes the disclosed antenna elements 100 in an antenna array 502 or just the antenna elements 100 individually, may be included onto or in the aircraft 600. This is shown in FIG. 6 with a dotted box. The antenna system 500 may be positioned inside or outside of the aircraft 600.

The illustration of the aircraft 600 is not meant to imply physical or architectural limitations to the manner in which an illustrative configuration may be implemented. For example, although the aircraft 600 is a commercial aircraft, the aircraft 600 can be a military aircraft, a rotorcraft, a helicopter, an unmanned aerial vehicle, or any other suitable aircraft. Other vehicles are possible as well, such as, for example but without limitation, an automobile, a motorcycle, a bus, a boat, a train, or the like.

Thus, various examples facilitate induction welding of parts by improving the heating of (e.g., more uniformly heat) the weld interface between the parts from a single side of the parts. The present disclosure, including the examples described herein, can be implemented using different manufacturing environments. For example, some or all aspects of the present disclosure can be implemented at least in the material procurement and component and assembly manufacturing, as described herein.

The following clauses describe further aspects of the present disclosure. In some implementations, the clauses described below can be further combined in any subcombination without departing from the scope of the present disclosure.

Clause Set A:

A1: An antenna element for generating a radio frequency (RF) signal, comprising:

a plurality of dielectric layers comprising a top dielectric layer, a middle dielectric layer, and a bottom dielectric layer;

a square ring patch positioned in the top dielectric layer;

a square ring slot;

a plurality of foam layers between the plurality of dielectric layers, wherein an upper foam layer separates the square ring patch from the square ring slot; and electrical feed lines supplying electrical power to generate electrical resonance in square the square ring slot for producing the RF signal in the square ring patch.

A2: The antenna element of claim A1, wherein the plurality of dielectric layers comprise one or more printed circuit boards.

A3: The antenna element of claim A1, wherein the square ring patch has a larger perimeter than the square ring slot.

A4: The antenna element of claim A1, wherein the plurality of foam layers are made of a low-dielectric foam or honeycomb material with low average dielectric constant.

A5: The antenna element of claim A1, wherein the plurality of dielectric layers comprise a top dielectric layer, a middle dielectric layer, and a bottom dielectric layer.

A6: The antenna element of claim A1, wherein the upper foam layer separates the top dielectric layer from the middle dielectric layer, and wherein the square ring patch is positioned between the top dielectric layer and the upper foam layer.

A7: The antenna element of claim A1, wherein the electrical feed lines are positioned at or about 90-degrees of rotation from each other.

Clause Set B:

B1: An antenna element for generating or receiving radio frequency (RF) signal, comprising:

a plurality of dielectric layers comprising a top dielectric layer, a middle dielectric layer, and a bottom dielectric layer;

a square ring patch positioned in the top dielectric layer;

a square ring slot;

a plurality of foam layers between the plurality of dielectric layers, wherein an upper foam layer separates the square ring patch from the square ring slot; and electrical feed lines receiving electrical power generated from electrical resonance received by the square ring patch and induced in the square ring slot.

B2: The antenna element of claim B8, wherein the plurality of dielectric layers comprise one or more printed circuit boards.

B3: The antenna element of claim B8, wherein the square ring patch has a larger perimeter than the square ring slot.

B4: The antenna element of claim B8, wherein the plurality of foam layers are made of a low-dielectric foam or honeycomb material with low average dielectric constant.

B5: The antenna element of claim B8, wherein the plurality of dielectric layers comprise a top dielectric layer, a middle dielectric layer, and a bottom dielectric layer.

B6: The antenna element of claim B8, wherein the upper foam layer separates the top dielectric layer from the middle dielectric layer, and wherein the square ring patch is positioned between the top dielectric layer and the upper foam layer.

B7: The antenna element of claim B8, wherein the electrical feed lines are positioned at or about 90-degrees of rotation from each other.

Clause Set C:

C1: An antenna array for communicating a radio frequency (RF) signal, comprising:

a plurality of antenna elements positioned in an antenna array, each antenna cell comprising:

a plurality of dielectric layers comprising a top dielectric layer, a middle dielectric layer, and a bottom dielectric layer;

a square ring patch positioned in the top dielectric layer;

a square ring slot;

a plurality of foam layers between the plurality of dielectric layers, wherein an upper foam layer separates the square ring patch from the square ring slot; and electrical feed lines supplying electrical power to generate electrical resonance in the square ring slot for producing the RF signal in the square ring patch.

C2: The antenna array of claim C1, wherein the plurality of dielectric layers are hexagonally shaped.

C3: The antenna array of claim C1, wherein the plurality of antenna elements are arranged in a triangular-array lattice with multiple antenna elements.

C4: The antenna array of claim C1, wherein the antenna array is disposed on an airplane.

Clause Set D:

D1: An antenna array for communicating a radio frequency (RF) signal, comprising:

a plurality of antenna elements positioned in an array, each antenna cell comprising:

- a plurality of dielectric layers comprising a top dielectric layer, a middle dielectric layer, and a bottom dielectric layer;
- a ring patch positioned in the top dielectric layer for receiving the RF signal;
- a foam layer between the top dielectric layer and the middle dielectric layer;
- a ring slot position between the foam layer and the middle dielectric layer, wherein the square ring slot being positioned to electromagnetically receive the RF signal from the square ring patch; and
- electrical feed lines positioned to output the RF signal received by the square ring slot as an output.

D2: The antenna array of claim D1, wherein the plurality of dielectric layers are hexagonally shaped.

D3: The antenna array of claim D1, wherein the plurality of antenna elements are arranged in a triangular-array lattice with multiple antenna elements.

D4: The antenna array of claim D1, wherein the antenna array is disposed on an airplane.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this disclosure to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as an ASIC, SoC, or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. An antenna element for generating a radio frequency (RF) signal, comprising:

- a plurality of dielectric layers comprising a top dielectric layer, a middle dielectric layer, and a bottom dielectric layer;
- a square ring patch positioned directly below the top dielectric layer;
- a square ring slot;

a plurality of foam layers between the plurality of dielectric layers, wherein an upper foam layer of the plurality of foam layers separates the square ring patch from the square ring slot, wherein the upper form layer separates the top dielectric layer and the middle dielectric layer, wherein the lower form layer of the plurality of foam layers separates the middle dielectric layer and the bottom dielectric layer; and electrical feed lines supplying electrical power to generate electrical resonance in the square ring slot for producing the RF signal in the square ring patch.

2. The antenna element of claim 1, wherein the plurality of dielectric layers comprise one or more printed circuit boards.

3. The antenna element of claim 1, wherein the square ring patch has a larger perimeter than the square ring slot, wherein the square ring patch has a square shape and the top dielectric layer has a hexagonal shape.

4. The antenna element of claim 1, wherein the plurality of foam layers are made of a low-dielectric foam or honeycomb material with low average dielectric constant.

5. The antenna element of claim 1, wherein the square ring patch is positioned between the top dielectric layer and the upper foam layer.

6. The antenna element of claim 1, wherein the electrical feed lines are positioned at or about 90-degrees of rotation from each other.

7. The antenna element of claim 1, wherein the upper foam layer contacts the square ring patch and the square ring slot.

8. An antenna element for generating or receiving a radio frequency (RF) signal, comprising:

a plurality of dielectric layers comprising a top dielectric layer, a middle dielectric layer, and a bottom dielectric layer;

a square ring patch positioned directly below the top dielectric layer;

a square ring slot;

a plurality of foam layers between the plurality of dielectric layers, wherein an upper foam layer of the plurality of foam layers separates the square ring patch from the square ring slot, wherein the upper foam layer separates the top dielectric layer and the middle dielectric layer, wherein a lower foam layer of the plurality of foam layers separates the middle dielectric layer and the bottom dielectric layer; and electrical feed lines receiving electrical power generated from electrical resonance received by the square ring patch and induced in the square ring slot.

9. The antenna element of claim 8, wherein the plurality of dielectric layers comprise one or more printed circuit boards.

10. The antenna element of claim 8, wherein the square ring patch has a larger perimeter than the square ring slot, wherein the square ring patch has a square shape and the top dielectric layer has a hexagonal shape.

11. The antenna element of claim 8, wherein the plurality of foam layers are made of a low-dielectric foam or honeycomb material with low average dielectric constant.

12. The antenna element of claim 8, wherein the square ring patch is positioned between the top dielectric layer and the upper foam layer.

13. The antenna element of claim 8, wherein the electrical feed lines are positioned at or about 90-degrees of rotation from each other.

14. The antenna element of claim 8, wherein the upper foam layer contacts the square ring patch and the square ring slot.

15. An antenna array for communicating a radio frequency (RF) signal, comprising:

a plurality of antenna elements positioned in an antenna array, each antenna element comprising:

a plurality of dielectric layers comprising a top dielectric layer, a middle dielectric layer, and a bottom dielectric layer;

a square ring patch directly below the top dielectric layer;

a square ring slot;

a plurality of foam layers between the plurality of dielectric layers, wherein an upper foam layer of the plurality of foam layers separates the square ring patch from the square ring slot, wherein the upper foam layer separates the top dielectric layer and the middle dielectric layer, wherein a lower foam layer of the plurality of foam layers separates the middle dielectric layer and the bottom dielectric layer; and electrical feed lines supplying electrical power to generate electrical resonance in the square ring slot for producing the RF signal in the square ring patch.

16. The antenna array of claim 15, wherein in each antenna element:

the plurality of dielectric layers are hexagonally shaped, and the upper foam layer contacts the square ring patch and the square ring slot.

17. The antenna array of claim 15, wherein the plurality of antenna elements are arranged in a triangular-array lattice with multiple antenna elements.

18. The antenna array of claim 15, wherein the antenna array is disposed on an airplane.

19. An antenna array for communicating a radio frequency (RF) signal, comprising:

a plurality of antenna elements positioned in an array, each antenna element comprising:

a plurality of dielectric layers comprising a top dielectric layer, a middle dielectric layer, and a bottom dielectric layer;

a ring patch positioned directly below the top dielectric layer for receiving the RF signal;

an upper foam layer between the top dielectric layer and the middle dielectric layer;

a lower foam layer between the middle dielectric layer and the bottom dielectric layer;

a ring slot positioned between the upper foam layer and the middle dielectric layer, wherein the ring slot is positioned to electromagnetically receive the RF signal from the ring patch; and electrical feed lines positioned to output the RF signal received by the ring slot as an output.

20. The antenna array of claim 19, wherein in each antenna element:

the plurality of dielectric layers are hexagonally shaped, wherein the ring patch has a square shape, and the upper foam layer contacts the ring patch and the ring slot.

* * * * *